Dec. 23, 1941. P. ARNDT 2,266,947
METHOD AND MEANS FOR CONTROLLING TEMPERATURES OF FLUIDS
Filed Feb. 21, 1939 3 Sheets-Sheet 1
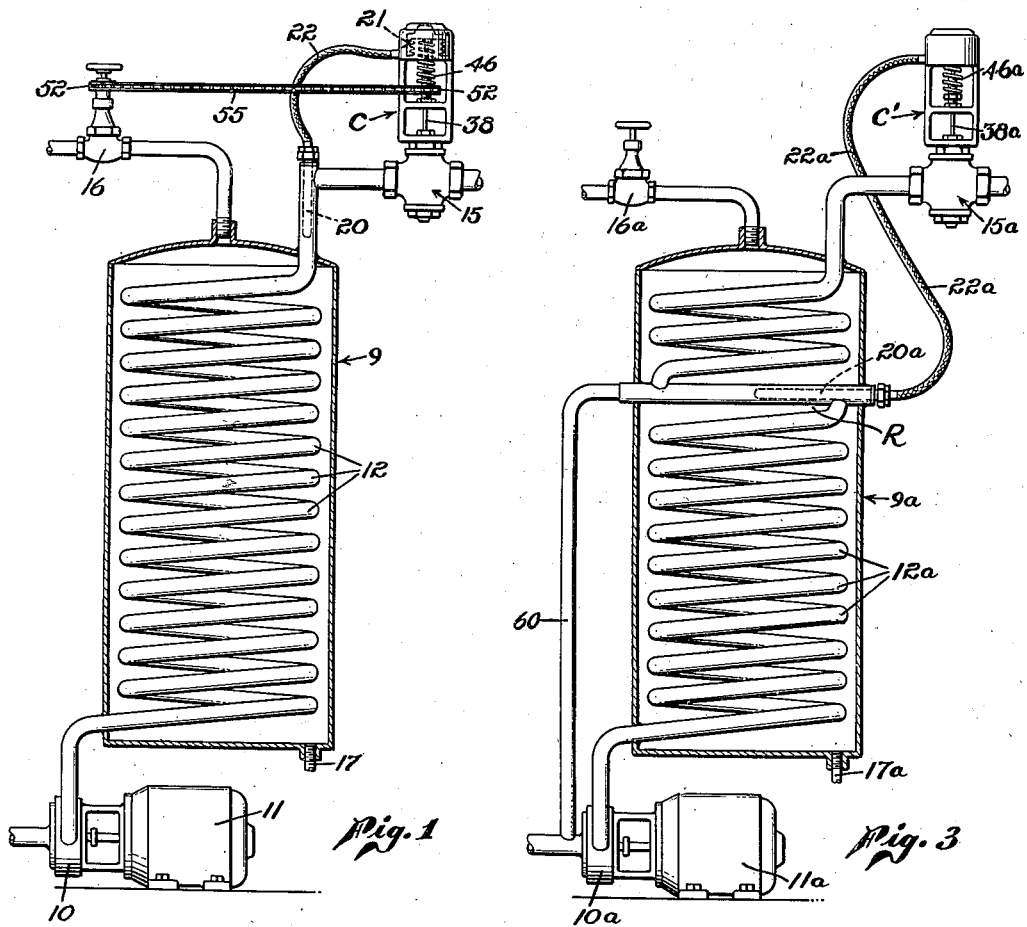
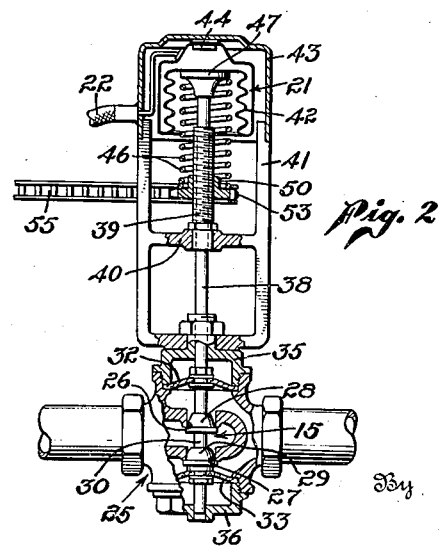
Inventor
PAUL ARNDT Dec. 23, 1941.                P. ARNDT                2,266,947
          METHOD AND MEANS FOR CONTROLLING TEMPERATURES OF FLUIDS
                   Filed Feb. 21, 1939         3 Sheets-Sheet 2
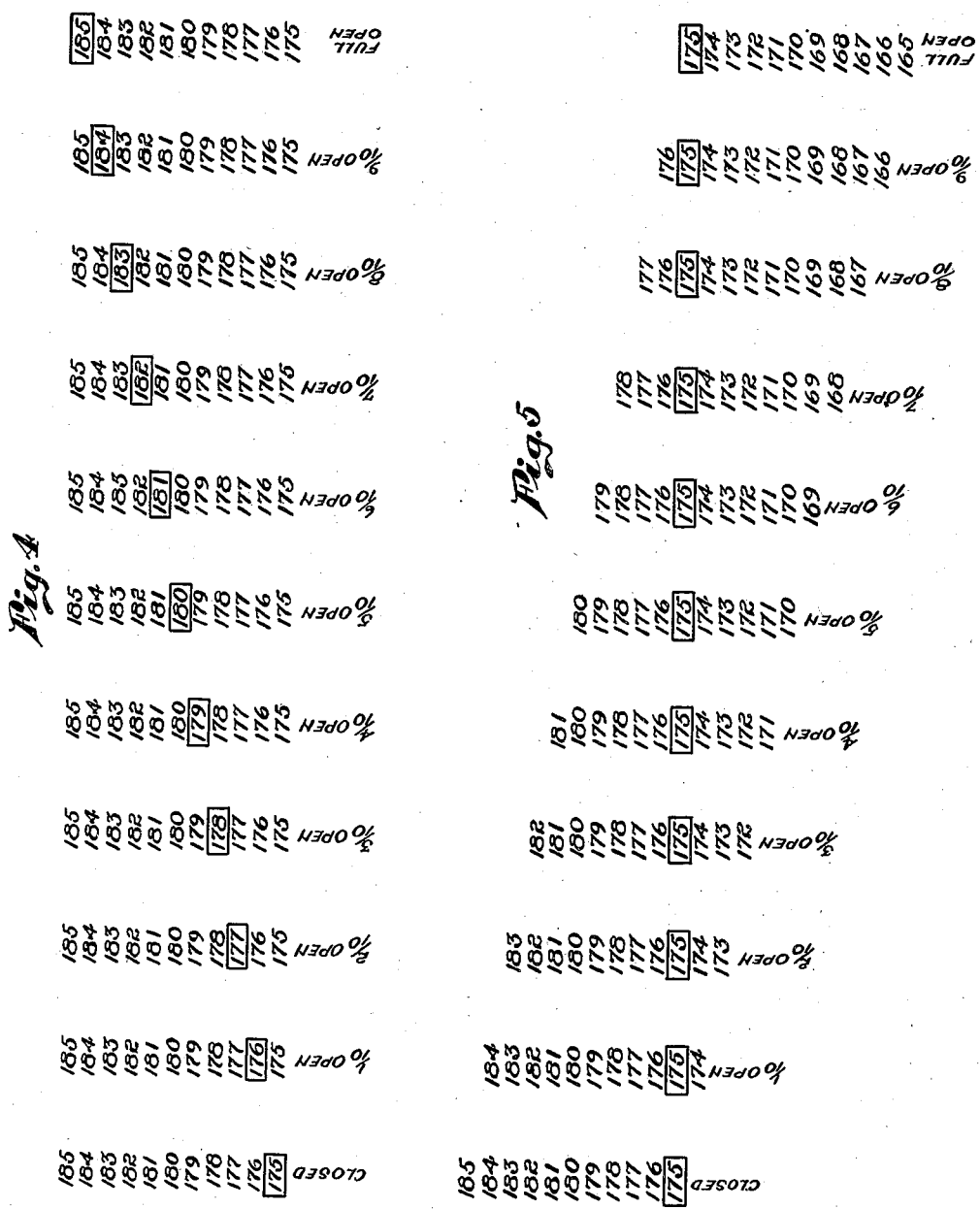

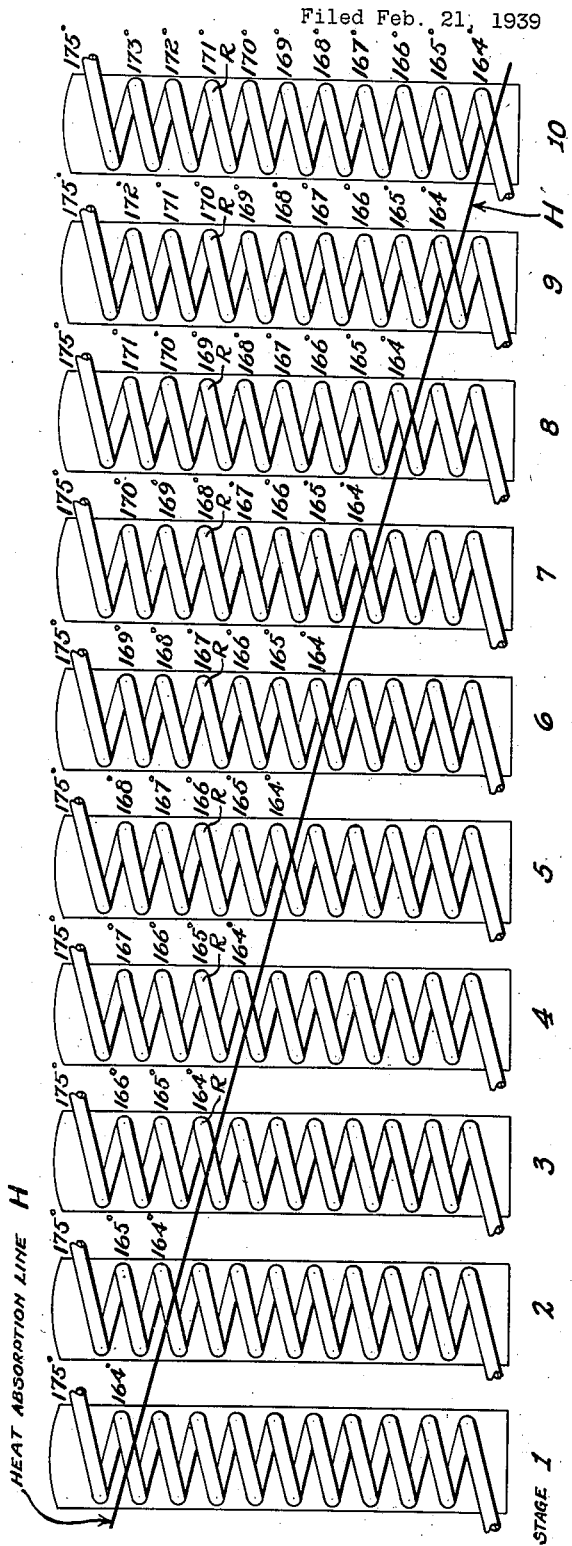

Patented Dec. 23, 1941

2,266,947

UNITED STATES PATENT OFFICE 2,266,947

METHOD AND MEANS FOR CONTROLLING TEMPERATURES OF FLUIDS

Paul Arndt, North Hollywood, Calif., assignor to Bireley's Incorporated, Los Angeles, Calif., a corporation of California Application February 21, 1939, Serial No. 257,698

9 Claims. (Cl. 236—18)

This invention relates to improved methods and apparatuses for treating fluids, being more specifically concerned with temperature control of the particular fluid operated upon.

Heat exchangers or pasteurizers have been used heretofore for heating a fluid or liquid to a definite predetermined temperature by causing it to pass through the unit at a definite rate of flow. The rate is determined by the setting of a valve in the outlet of the unit, or by control of the fluid pumping speed. Attempts have been made at maintaining the outgoing fluid temperature to its predetermined point by controlling automatically the flow of a heating medium for the fluid in dependence upon the outgoing fluid temperature. Thus, if the outgoing fluid temperature were to increase above the desired point, a suitable controller, functioning in accordance with changes in fluid temperature, would decrease the rate of flow of the heating medium. Contrariwise, a decrease in fluid temperature would cause the controller to increase the flow of the heating medium.

The aforementioned system of control is attended with many disadvantages. It is essential for the outgoing fluid temperature to vary from the desired, predetermined point before any corrective measures are undertaken. Obviously, if control is dependent upon such variation, the outgoing fluid temperature cannot remain constant at all times. Moreover, there is a time lag between the effect of the controller on the flow of the heating medium and the exchange of heat between the medium and fluid being treated. Such lagging produces an over-controlling tendency in the system, causing continuous fluctuations in the outlet fluid temperatures and hunting of the controller. These effects are particularly pronounced when an extreme shock is given to the fluid; as, for example, by suddenly increasing its rate of flow by a wide margin. The fluid temperature will fall far below the desired point, rising to the proper degree only as the controller permits a greater supply of heating medium to transfer its heat to the fluid.

It is an object of the present invention to overcome the aforementioned and other difficulties.

Another object of the invention is to provide an apparatus embodying a heat exchanger which is efficient and reliable in operation and which is capable of precise automatic regulation.

A further object of the invention is to provide a system of heat exchange in which the outgoing temperature of fluid being treated is maintained to a predetermined point through automatic control of its rate of flow.

Another object of the invention is to maintain the outgoing temperature of a fluid being treated to a predetermined point regardless of changes in its rate of flow or of the rate of flow of a heating medium.

Still another object of the invention is to maintain the outgoing temperature of a fluid being treated constantly at a predetermined point regardless of changes in the inlet temperature of the fluid or in the heat content of the heating medium employed for elevating the fluid temperature.

A further object of the invention is to provide a system for treating fluids embodying an improved method of control for accurately maintaining the fluid temperature to the desired point notwithstanding variations in its rate of flow, or its initial temperature, or the heat content of the medium used for elevating its temperature.

Valves ordinarily used in effecting automatic control of the fluid outlet temperature are operable throughout their throttling range of from fully closed to full open positions by the pressure of a gas or liquid on a valve diaphragm. As the fluid temperature increases, the gas pressure increases, exerting a greater force on the diaphragm and tending to produce opening of the valve. Since the movement of the diaphragm is opposed by a suitable spring of predetermined tension, each change in gas pressure results in a definite change of the valve opening. Therefore, each position of the valve opening corresponds to a definite position of the diaphragm and to a definite temperature of the gas and fluid being treated. Accordingly, the range of movement of the valve from fully opened to fully closed positions corresponds to a fixed range or band of temperatures. While the valve can be adjusted for a definite control temperature, that point will correspond to only one position of valve opening, so that changes in valve opening would also effect a change in the control temperature or point. The valve and its temperature-responsive controller are therefore incapable of maintaining the fluid outlet temperature constant for different rates of fluid or heating medium flow.

It is another object of the present invention to maintain the control temperature or point of a valve regulator constant regardless of changes in its extent of opening.

A further object of the invention is to provide a control for a heat exchange apparatus having a variable range or band of operation in order to maintain the control point of a regulator constant and independent of changes in the extent of valve opening.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a partially diagrammatic illustration of one form of a system embodying the present invention.

Figure 2 is an enlarged sectional view through the outlet valve and controller.

Figure 3 is a diagrammatic illustration of another system embodying the invention.

Figure 4 is a table of specific figures giving an example of the relationship between the degree of valve opening, the control points of the valve controller, and the band or range of temperature operation of the valve controller, which data is associated with one mode of valve regulation.

Figure 5 is a table similar to Figure 4 consisting of data associated with another mode of valve regulation.

Figure 6 is an illustration of a representative heat exchanger in ten stages, designed to show the principle of control upon which the system of Figure 3 is based.

In the system disclosed in Figure 1, it is desired to raise the temperature of a fluid flowing through a suitable heat exchanger 9, which in the instant case is disclosed as being of the helical coil type, although it is to be understood that other types of exchangers can be used without departing from the present invention. The fluid to be treated is drawn from a suitable source into a pump 10 driven by a suitable prime mover, as the motor 11. It is discharged from the pump and caused to pass through the helical coil 12 to the outlet of the heat exchanger, its rate of flow being determined by the extent of opening of a valve 15 positioned in the outlet. The temperature of the fluid being treated is elevated by causing a heating medium, such as steam, to pass around the helical coil 12 and transfer its heat to the fluid. The steam enters the heat exchanger 9 through a suitable manual control valve 16, discharging from an outlet 17 in the bottom thereof either in condensate form or in a vapor state, depending upon operating conditions.

It is desired to maintain the outgoing fluid temperature constant regardless of variations in its rate of flow through the heat exchanger. The necessary regulation is effected by positioning a suitable thermostat control bulb 20 in the fluid outlet, variations in outlet temperature causing pressure increase or decrease of the fluid or gas within the bulb, which will have an effect upon the valve opening through its action upon a valve control diaphragm 21 with which the bulb 20 is connected through the flexible tube 22.

One form of valve usable in the present system is best disclosed in Figure 2 and includes a valve body 25 placed in the fluid outlet. This valve is of the balanced type in order that the pressure of the fluid passing through it will have no effect upon its extent of opening. For this purpose, the valve is provided with a plurality of valve seats 26 and 27 adapted to receive the valve heads 28 and 29 fixed to a valve stem 30 extending through the valve body 25. Diaphragms 32 and 33 are fixedly carried by the stem 30 on opposite sides of the valve seats 26 and 27, and are rigidly secured to the valve body 25 by clamping them between the body and the caps 35 and 36 threadedly secured thereto.

One end of the valve stem 30 extends through the cap 35 and is rigidly secured to a control rod 38 slideable within a sleeve 39 fixed to an intermediate partition 40 in the control housing 41, and bearing against or suitably fixed to the movable end of a flexible diaphragm or Sylphon 42, whose other end is suitably secured to a cover 43 of the control housing, as by use of a rivet or bolt 44. The conducting tube 22 leading from the thermostat bulb 20 communicates with the Sylphon 42 in order that changes in gas pressure due to temperature variations will tend to alter the position of the movable portions of the diaphragm 42, and will correspondingly tend to slide the control rod 38 in its guiding sleeve 39 and determine the degree of opening of the valve. Movement of the diaphragm 42 and control rod 38 toward valve opening position is opposed by a helical spring 46 surrounding the rod and guide sleeve 39. One end of the spring 46 abuts the upper enlarged end 47 of the rod 38 engaging the diaphragm 42, and its other end engages an adjustable nut 50 threaded upon the guide sleeve 39. It will therefore be seen that increase in fluid temperature will cause the gas in the control bulb 20 to expand and tend to open the valve through movement of the diaphragm or Sylphon 42 and the push rod 38. However, this tendency is opposed by the action of the helical spring 46 urging the valve toward closed position.

The controller spring 46 predetermines the relationship between the temperature of the fluid in the heat exchanger outlet and the extent of valve opening. There is a definite range of temperatures, determined by the tension setting of the spring 46, which will effect the degree of valve opening from fully closed to fully open positions, and each degree of temperature within the range corresponds to a definite valve opening. The mode of operation of the controller and its limitations can perhaps be best understood by considering an example of its operation.

Referring to Figures 2 and 4, let it be assumed that the controller spring 46 is such as to permit a change of 10 degrees in outlet temperature to move the valve from fully closed to fully open positions, and that the valve begins to open at 175 degrees, Figure 4. Assuming that the gas in the bulb expands in equal increments for each degree of temperature rise, each unit of temperature increase will cause the valve to open a one-tenth part. That is, if the temperature increases to 176 degrees, the valve will be one-tenth open; if it changes to 177 degrees, the valve will be two-tenths open; and so on until a temperature of 185 degrees is obtained, which will produce full opening of the valve under the influence of the expanding gas.

However, it is desired to hold the outlet temperature constant at 175 degrees regardless of the extent of valve opening. In the system so far described, the controller has a different control point or temperature for each extent of valve opening. Referring again to Figure 4, for a one-tenth opening the control point is 176 degrees;

for a five-tenths opening, the control point is 180 degrees, etc. As a result, the thermostat bulb 20 and controller mechanism are incapable of maintaining the fluid temperature constant irrespective of its rate of flow, or corresponding extent of valve opening, since the temperature at which the controller becomes effective varies in accordance with the extent of valve opening.

Usually, an increase in the rate of flow through the heat exchanger of the fluid being treated requires a corresponding increase in the rate of flow of the heating medium. As disclosed in Figure 1, the extent of steam flow is determined by the manual control valve 16. The present invention contemplates the maintenance of the control point of the controller constant throughout the operating range of the fluid outlet valve 15 by altering the effectiveness of the gas pressure in the controller upon the push rod 38 and connected valve stem 30. One manner of accomplishing this objective is to change the tension in the controller spring 46.

In the instant case, this is accomplished by decreasing its tension as the steam valve 16 is opened, and increasing the tension as the steam valve is closed.

A driving sprocket 52 is secured to the stem of the steam valve 16 and a driven sprocket 53 is secured to the adjustable spring nut 50, or a sprocket having an internally threaded hub can be substituted for the nut. A chain 55 passes over both sprockets to transmit the rotary motion of the driving member to the driven member and cause longitudinal movement of the latter element on the threaded sleeve 39 to increase or decrease the tension of the spring 46 in accordance with decrease or increase in the steam valve opening.

If the spring tension is decreased, the gas in the thermostat bulb 20 must be heated to a lesser degree to produce opening of the valve 15. If the rate of fluid flow is to be increased due to a greater extent of outlet valve opening, the steam valve opening must be increased to properly heat the increased fluid volume, which will produce a corresponding decrease in the spring tension. The gas in the controller system is, accordingly, capable of opening the outlet valve at a lesser temperature, and since a definite number of degrees of temperature change is needed to open the valve between fully closed and fully opened positions, the operating range or band of the controller is gradually being driven down to lower operating limits upon increase in the rate of steam flow and corresponding increase in the extent of outlet valve opening.

Let it now be assumed that the temperature of the outgoing fluid is to be maintained at 175 degrees, as in the previously stated example (see Figure 5). Rather than a change in the control point or temperature being produced as the valve 16 is opened more fully, the control temperature will remain constant at the desired value of 175 degrees since this particular temperature corresponds to each and every degree of valve opening, in view of the fact that the spring tension is progressively being decreased by the spring nut 50 as the rate of fluid flow necessary because of increased steam flow increases, permitting the pressure generated in the gas at 175 degrees to open the valve more fully due to the lessened spring resistance.

Consequently, the outlet temperature of the fluid can be maintained constant regardless of whether its rate of flow is low or high. However, this desirable characteristic will only be obtained in the event that the heat content of the steam entering the system remains constant, and that the inlet temperature of the fluid entering the heat exchanger also remains constant. If the incoming fluid temperature were to vary, the outgoing temperature would change correspondingly. Change in heat content of the steam, such as is due to a drop in pressure, would correspondingly produce a decrease in the fluid outlet temperature since the controller must be set originally for a particular steam heat content and incoming fluid temperature.

The form of invention disclosed in Figure 3 can maintain the outgoing fluid temperature constant regardless of its rate of flow, and independently of variations in its initial temperature and heat content of the heating medium but maintaining a definite co-relation between the heat input from the steam and the flow of the fluid. The general arrangement of parts is substantially the same as in the embodiment disclosed in Figure 1, with the exception that there is no mechanical connection between the steam valve 16a and the controller C', the tension of the controller spring 46a remaining unaltered after being set at a predetermined value. The main difference between the systems of Figure 1 and Figure 3 is that the control bulb 20a in the latter is placed in an intermediate stage of the fluid line 12a within the heat exchanger, rather than being placed in the fluid outlet. Since the pump 10a can be driven at substantially constant speed, a by-pass line 60 is provided between the intermediate stage R in the exchanger receiving the control bulb 20a and the pump inlet, to permit return of excess fluid delivered by the pump, which is prevented from passing through the outlet by the outlet control valve 15a.

An understanding of the mode of operation of the system shown in Figure 3 can perhaps be had by referring to Figure 6, disclosing a representative heat exchanger in 10 stages or conditions of operation.

In this illustration, the fluid is to be heated to 175 degrees regardless of the degree of outlet valve opening up to the unit's full capacity. Stage 1 shows the outlet temperature at 175 degrees and the rate of fluid flow or gallonage and quantity of heating medium very low. Stage 2 shows a greater gallonage of fluid to be heated and a greater flow of heating medium, with the outlet temperature still 175 degrees. The gallonage and quantity of heating medium both increase progressively in the remaining stages, but in each instance Figure 6 shows that the outlet temperature will remain constant at 175 degrees provided that its rate of flow is properly controlled. Such rate of flow is governed by the extent of opening of the outlet valve 15a.

Despite the degree of opening of the outlet valve required to maintain the outlet temperature constant, it is found that the temperatures of the fluid within the heat exchanger progressively increases with the increase in the steam valve opening, which in turn causes an increase in the application of heating medium to the system, demonstrating that the heat absorption line (or in other words the number of square inches of tubing required to transfer the required amount of heat to the fluid in proportion to the volume being heated), is being driven downwardly, or away from the outlet as indicated by the line H in Figure 6. An examination of Figure 6 discloses that the temperature at any given intermediate point in the heat exchanger coil such as point R, increases in temperature as the heat absorption line is driven downwardly as heretofore described. This phenomenon may be readily attained in cases where the heating medium is a condensing vapor as there is very little heat transfer from the condensed heating medium compared to that which is available from the heating medium as it is condensed on the tubes containing the flowing fluid. As the fluid leaving the exchanger is intended to have a temperature which is constant regardless of the amount of fluid flowing through the exchanger it is readily seen that the temperature at point R must change as the major portion of the heat exchange takes place along varying lengths of the exchanger coils. This change in the temperature at point R is, however, not confined to the use of condensable liquids as a heating medium. The variation of the temperature of point R when a liquid is used as a heating medium is much smaller than when a condensing heating medium is used but is nevertheless present. This condition is availed of to control the degree of opening of the outlet valve, and consequently, the extent of flow therethrough, indirectly resulting in the maintenance of the fluid outlet temperature at the desired constant value.

Therefore, if the control bulb 20a for the outlet valve 15a is placed in any position within the fluid path 12a in the heat exchanger as the point R, that position or point must have a number of degrees change in temperature corresponding to the number of degrees subtended by the band in the controller C'. That is, if the controller is designed to move the valve 15a from a fully closed to a fully opened position upon a change in temperature of 10 degrees in the control bulb 20a, then the point (such as R) in the heat exchanger in which the control bulb is inserted must be susceptible to a change of 10 degrees. If the intermediate point R in the heat exchanger at which the control bulb is placed changes 20 degrees in temperature upon change in the fluid rate of flow from lowest to highest gallonage, then the controller band must also be set so as to move the valve from fully closed to fully open position within that temperature range. Thus must be done in order that the expansion of the gas in the control bulb caused by increase in temperature at the intermediate heat exchanger point R will open the valve sufficiently to increase the rate of flow of the fluid and maintain its outlet temperature at a constant figure. Of course, decrease in the temperature at the control point would produce a corresponding closing of the outlet valve to maintain the fluid temperature constant.

The system described achieves the same result as is produced by the Figure 1 arrangement, but it is not dependent upon the position of the steam valve, nor the heat content of the heating medium or the temperature of the incoming fluid. The sole control is performed by the control bulb 20a which will effect operation of the outlet valve 15a and permit it to pass fluid at the correct temperature and at the proper rate in proportion to the heat transmitted to the fluid in the system. Thus, the only control means required in this system is the valve 15a. It is thus seen that the flow of fluid through valve 15a is controlled by the temperature of fluid at point R. As this temperature is a function of the flow required to maintain the outlet temperature at the desired value, the outlet temperature will be always that desired. This is different from utilizing the outlet temperature to operate the control means, because in the latter case, as the temperature goes up the flow will increase, but only enough to cause the valve to take a new position corresponding to that temperature. This would mean that a greater input of heat into the system would give a greater flow, but a greater flow will be at a higher temperature than that desired.

The arrangement is therefore fool-proof in its operation. Extreme shocks to the system, as would be caused by sudden complete opening or closing of the steam valve, have no effect upon the outlet temperature of the fluid being treated. The control devices function instantaneously to alter the rate of flow and prevent deviation of the outlet temperature from the desired degree at any given rate of flow up to its full capacity.

It is to be understood that the specific values of temperature and degrees of valve opening described in this specification were chosen for illustrative purposes only, since the values required in actual practice could deviate from the figures named, being dependent upon the character of the fluid being treated and the final outlet temperature required.

I claim:

1. An apparatus including a heat exchanger for fluid to be heated and a condensable heating medium, a valve for controlling the flow of fluid through said exchanger, a pressure responsive controller for moving said valve between closed and open positions, a thermostatic element producing a pressure varying with the temperature of said element, means operatively connecting said element and said controller, said thermostatic element being subject to the temperature of the fluid being heated at an intermediate point normally within the region of condensation of the heating medium.

2. An apparatus including a heat exchanger having a confined path for the flow of fluid to be heated and a separate path for the passage of the heating medium, a valve in the fluid outlet, a pressure responsive controller for moving said valve between closed and open positions, a fluid containing thermostatic element in the fluid path intermediate the ends thereof, fluid circulating means including a pump connected to the inlet end of the confined path and to a point beyond the thermostatic element, a supply line for the fluid to be heated connected to the inlet of the pump, and an operative connection between the thermostatic element and the valve controller.

3. An apparatus including a heat exchanger having a confined path for the flow of fluid and a separate path for the passage of a condensing heating medium in a direction opposite to the flow of the fluid, a valve in the fluid outlet, control means for moving said valve between open and closed positions, a temperature responsive means in the path of flow of the fluid intermediate the ends thereof and in the region of condensation of the heating medium, fluid circulating means including a pump connected to the inlet end of the confined path and to a point beyond the temperature responsive means, a supply line for the fluid connected to the inlet of the pump, an operative connection between the temperature responsive means and the valve causing variation in the flow through said valve in response to variation in the temperature in the temperature responsive means.

4. An apparatus for heating fluid with a condensable heating medium comprising, a heat exchanger having means for causing flow in one direction of said fluid and flow in the opposite direction of said heating medium, means for controlling the flow of said fluid through said heat exchanger, and means, responsive to the temperature of a point intermediate the ends of the path of flow of fluid normally in the zone of condensation of said heating medium, for operating the control means.

5. The method of temperature control of a liquid being heated while flowing through a heat exchanger which comprises flowing a condensing heating medium in a reverse direction to the flow of the liquid, and controlling the flow of the liquid through the exchanger in response to the temperature of the liquid at a point intermediate the ends of the path of the liquid through the exchanger, in such a manner that the final temperature of the liquid remains constant for varied flow of the liquid.

6. In apparatus for imparting heat to a stream of moving fluid so as to elevate the temperature to a constant value at the outlet of the apparatus, a heat exchanger having a conduit for the fluid, said heat exchanger serving to impart heat to the fluid as the fluid progresses to the outlet, said fluid thereby acquiring a temperature gradient along the conduit dependent upon the rate of heat transfer to said fluid in the heat exchanger, and means for varying the rate of flow of fluid to correspond with the temperature attained at an intermediate point along said gradient.

7. In apparatus for imparting heat to a stream of moving fluid so as to elevate the temperature to a constant value at the outlet of the apparatus, a heat exchanger including a conduit for the fluid, as well as means serving to impart heat to the fluid as the fluid progresses to the outlet, said fluid thereby acquiring a temperature gradient along the conduit, means for varying the rate of heat transfer to said fluid while it flows through the conduit, thereby varying the said temperature gradient, and means for varying the rate of flow of fluid to correspond with the temperature attained at an intermediate point along said gradient, at a fixed intermediate point along said conduit.

8. In a system for elevating the temperature of a moving column of fluid to a predetermined value at the outlet of the column, the method which comprises transferring heat to the column at a controllable rate to vary the temperature gradient of the column, and controlling the flow of fluid through the column to correspond with the temperature attained at an intermediate point of the column.

9. In apparatus for changing the heat content of a stream of moving fluid so as to bring the temperature to a constant value at the outlet of the apparatus, a heat exchanger having a conduit for the fluid, said heat exchanger serving to change the heat content of the fluid as the fluid progresses to the outlet, said fluid thereby acquiring a temperature gradient along the conduit dependent upon the rate of heat transfer in said heat exchanger, and means for varying the rate of flow of fluid to correspond with the temperature attained at an intermediate point along said gradient.

PAUL ARNDT.